April 11, 1967 A. G. CHAMBERLAIN, JR 3,313,915
ELECTRIC HEATER FOR AUTOMOBILES
Filed Jan. 31, 1964 2 Sheets-Sheet 1
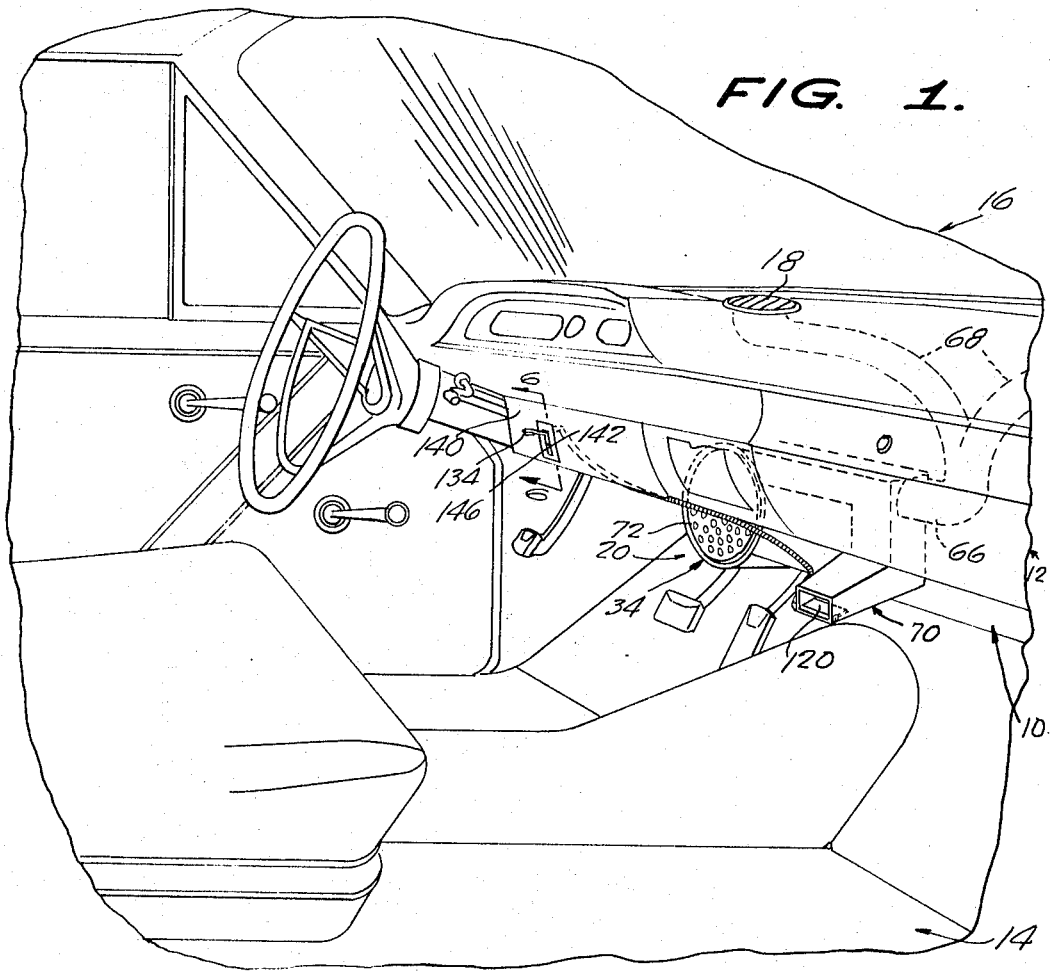
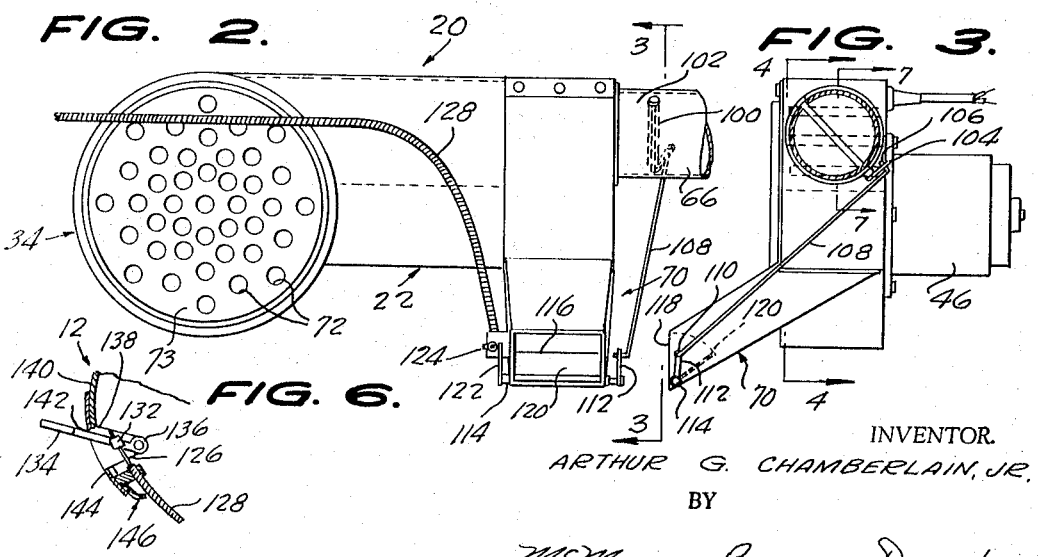
INVENTOR.
ARTHUR G. CHAMBERLAIN, JR.
BY
McMorrow, Berman & Davidson
ATTORNEYS.

April 11, 1967  A. G. CHAMBERLAIN, JR  3,313,915
ELECTRIC HEATER FOR AUTOMOBILES
Filed Jan. 31, 1964  2 Sheets-Sheet 2
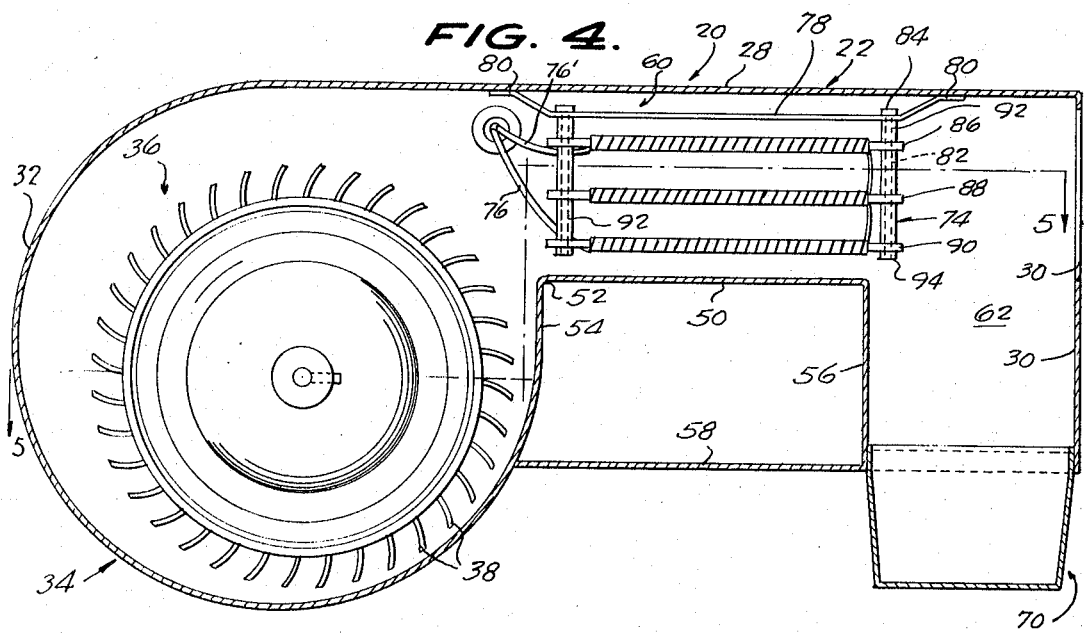
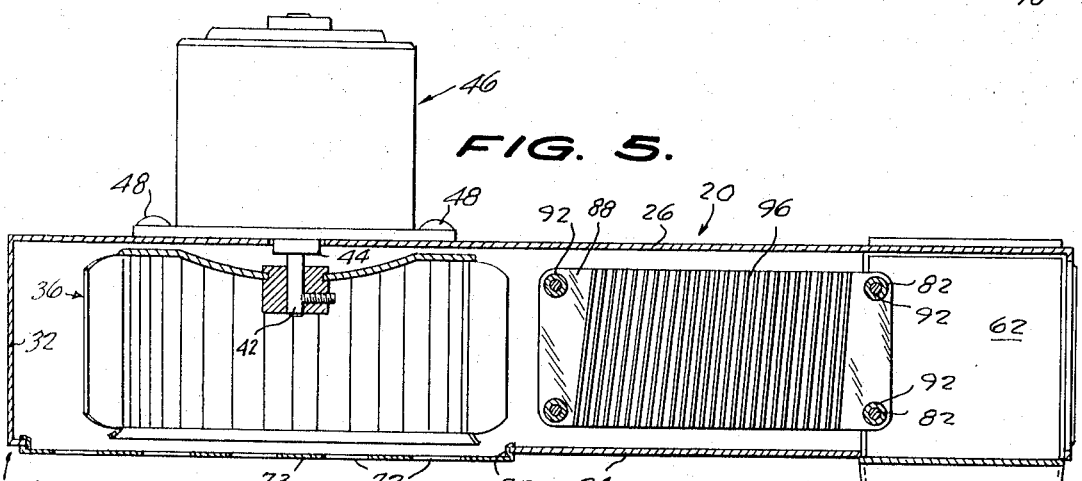
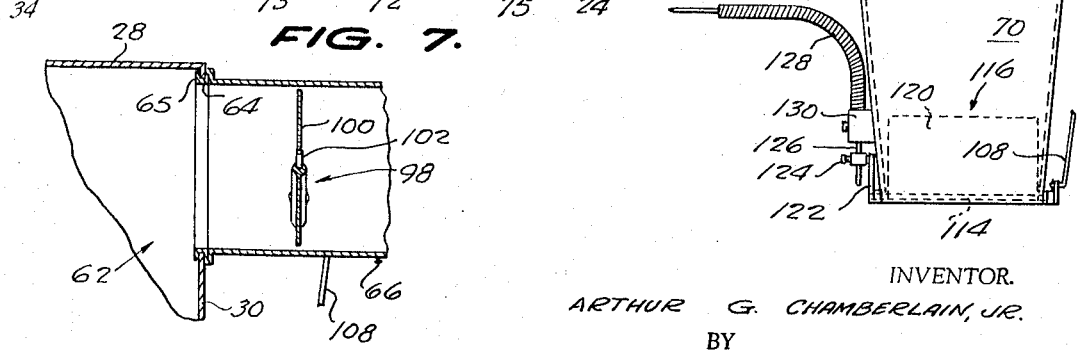
INVENTOR.
ARTHUR G. CHAMBERLAIN, JR.
BY
McMorrow, Berman & Davidson
ATTORNEYS.

United States Patent Office 3,313,915
Patented Apr. 11, 1967

3,313,915
ELECTRIC HEATER FOR AUTOMOBILES
Arthur G. Chamberlain, Jr., 9 W. Kenneth St.,
Lawrence, Mass. 01843
Filed Jan. 31, 1964, Ser. No. 341,544
5 Claims. (Cl. 219—370)

This invention relates to a novel electric heater for automobiles.

The primary object of the invention is the provision of a more efficient, more compact, and simpler heater of the kind indicated, which produces heated air, almost immediately, when turned on, and which discharges a greater volume of heated air into the interior of an automobile, and produces greater circulation therein.

Another object of the invention is the provision of a more easily installed heater of the character indicated above, which is adapted to be mounted inconspicuously entirely within the passenger space of an automobile, on the firewall and beneath the instrument panel thereof.

Other important objects and advantageous features of the invention will be apparent from the following description and the accompanying drawings, wherein, for purposes of illustration only, a specific form of the invention is set forth in detail.

In the drawings:

FIGURE 1 is a fragmentary perspective view of the passenger compartment of an automobile, showing a heater of the present invention installed therein;

FIGURE 2 is an enlarged fragmentary rear elevation of the heater, per se;

FIGURE 3 is a right-hand elevation, partly in section, taken on line 3—3 of FIG. 2;

FIGURE 4 is an enlarged vertical longitudinal section taken on the line 4—4 of FIGURE 3;

FIGURE 5 is a horizontal section taken on the line 5—5 of FIGURE 4;

FIGURE 6 is an enlarged fragmentary vertical transverse section taken on the line 6—6 of FIGURE 1, showing details of the discharge valve; and, FIGURE 7 is an enlarged fragmentary vertical longitudinal section taken on the line 7—7 of FIGURE 3.

Referring in detail to the drawings, FIGURE 1 shows the rear surface of a firewall 10, located in forwardly spaced relation to an instrument panel 12, the latter being spaced above the floor 14. A windshield 16 rises above the front part of the instrument panel 12, and the latter is formed, in its top, with grilled windshield defroster openings 18, spaced lengthwise of the windshield. A heater 20, of the present invention, is shown, with a major portion thereof positioned out of sight behind the instrument panel 12, and is preferably, and suitably mounted on the rear side of the fire wall 10.

The heater 20 comprises a horizontally elongated housing 22, which is preferably of rectangular horizontal cross section, and of relatively shallow width. The housing 22 comprises parallel front and back walls 24 and 26, respectively, a horizontal top wall 28, a first or right-hand end wall 30, and a second or left-hand end wall 32. The left-hand end wall 32 is semi-circular, and curves outwardly and downwardly from the top wall 28, and then inwardly and upwardly, so as to define a substantially cylindrical blower casing 34.

A rotary blower 36, having blades 38 curved in a clockwise direction, is positioned eccentrically within the blower casing 34, to the right of the center thereof. The blower is carried by a motor shaft 42, which extends rearwardly through an opening 44, in the heater housing back wall 26, from an electric motor 46, which is fixed, as indicated at 48, to the rear side of the back wall 26. Suitable electrical switched connections (not shown) are provided for the motor 46.

The heater housing 22 is formed with a relatively short horizontal bottom wall 50, which is located close to and is parallel with the top wall 28. The bottom wall 50 extends between the upper end 52 of the right-hand portion 54 of the blower casing-defining left-hand end wall 32, to the upper end of a vertical internal partition wall 56, which extends across the interior of the housing 22. A horizontal false bottom wall 58 extends between the lower end of the partition wall 56 and the blower casing 34, and serves to brace the structure. The bottom wall 50, the front and rear housing walls, and the top wall 28 define a heating chamber 60, and the front and rear walls, the top wall 28, and the right-hand end wall 30 define a vertical heated air discharge duct 62.

Opposite the discharge end of the heating chamber 60, the right-hand end wall 30 is formed with an opening 64, in which is adapted to be secured, as indicated at 65, a windshield defroster heated air inlet pipe 66, which leads to two discharge hoses 68, which are severally connected to the defroster openings 18, so that heated air blown through the heating chamber 60 moves at full force and maximum temperature, directly to the defroster hoses for maximum windshield defrosting action.

The heated air from the heating chamber 60 also moves downwardly, under substantial pressure, within the duct 62, and then downwardly and rearwardly into the passenger compartment, beneath the instrument panel 12, through a rearwardly declining rearwardly tapered discharge nozzle 70, preferably of rectangular vertically flattened shape, and which can, as shown in FIGURE 1, extend rearwardly beyond the instrument panel 12. Passenger compartment air enters the blower casing 34, through perforations 72 provided in a plate 73, inset in an opening 75 in the rear wall of the blower casing.

The air, in transit through the heating chamber 60, is substantially instantly heated by contact with an electrical heating assembly 74, which is positioned in the chamber 60, and has suitable switched electric connections 76 and 76'.

The heating assembly 74 comprises a horizontal, longitudinally elongated bracket 78 which spacedly underlies the heater housing top wall 28, and is secured, at its ends, as indicated at 80 thereto. Pairs of vertical carrier rods 82 are fixed, at their upper ends, as indicated at 84, to the bracket 78, near its ends, and extend downwardly through the corners of upper, intermediate and lower insulative plates 86, 88, and 90, respectively. Spacer sleeves 92, on the carrier rods 82, space the insulative plates from the bracket 78, from each other, and from retaining heads 94, on the lower ends of the rods. The insulative plates are wound with heating element wires 96, which are suitably connected to the connections 74 and 76.

A first or defroster valve assembly 98, for controlling the volume of discharge of heated air from the right-hand end wall opening 30 to the defroster hoses 68, is provided in the inlet pipe 66, and comprises a circular butterfly valve 100, fixed on a diametrical shaft 102 which is journaled, at its ends in the pipe 66, and has, on its lower end, a radial arm 104, to the outer end of which is pivoted, at 106, a link 108. The link 108 extends downwardly and rearwardly to the discharge nozzle 70, and is pivoted, at its lower end, at 110, to a radial arm 112, on the right-hand end of the horizontal shaft 114 of a second discharge valve assembly 116.

The second valve assembly 116 comprises the shaft 114, which is located at the rear end 118 of the nozzle 70, at the bottom thereof, and a plate or flap valve 120 which is fixed to the shaft 114, within the nozzle 70. The shaft 114 has a vertical radial arm 122, on its left-hand end, to which is pivotally secured, as indicated at 124, the end of a Bowden wire 126. The wire 126 is slidably encased in a flexible tube 128 which is anchored, as indicated at 130, to the adjacent side of the nozzle. The wire 126 and its tube 128 lead beneath the instrument panel 12, and the adjacent end of the wire 126 is connected, as indicated at 132, and as shown in FIGURE 6, to a control lever 134, which is pivotally mounted, as indicated at 136, on a bracket 138 which extends forwardly from the rear wall 140 of the instrument panel. The lever 134 extends rearwardly through a slot 142, formed in the wall 140 and through a vertical slot 144 provided in a face plate 146 which is secured to the rear surface of the wall 140.

With the above described arrangement of valves and control lever 134, the volumes of heated air discharged to the defroster hoses and from the discharge nozzle 70, are adapted to be simultaneously adjusted, by raising and lowering the lever 134, from a convenient position, close to the driver of the automobile or any other desired location.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An electrical air heater for mounting behind an automobile firewall and partly under the instrument panel in the passenger compartment, comprising a horizontal housing having an air intake at one end thereof and a heated air discharge nozzle at its other end, said housing having a cylindrical blower casing at said one end in communication with said air intake and a reduced cross section, horizontal, heating chamber tangential to the blower casing connecting the blower casing and the nozzle, an electrically driven, rotary blower mounted in said blower casing, an electrical heating assembly mounted in said heating chamber, said housing having a vertical heated air duct communicating at its upper end with the discharge end of the heating chamber and at its lower end with a laterally projecting discharge nozzle, said heating assembly comprising a bracket fixed to the housing within the heating chamber, carrier rods extending from the bracket vertically across the chamber, and longitudinally disposed, parallel, spaced electrical heating elements secured on the carrier rods, a defroster pipe connected to the discharge end of said housing and disposed in line with the heating chamber, a first valve assembly located in said defroster pipe, a second valve assembly mounted in said discharge nozzle, said valve assemblies having pivoted valves, means operatively connecting the valves together, and control means for mounting on an instrument panel operatively connected to one of the valves, said control means including a pivotally supported control lever, a flexible wire connected at one end to said lever, and a radial arm on one of said valves to which the other end of the wire is connected.

2. An electrical air heater according to claim 1, wherein said means operatively connecting the valves together comprises a pair of radial arms each fixed to the pivot shaft of one of said valves, and a rigid link pivotally secured to the free ends of said pair of radial arms.

3. An electrical heater for mounting behind a firewall and partly under an instrument panel of an automobile, comprising an elongated housing having front and back walls, horizontal top and bottom walls, a vertical end wall, and a cylindrical blower casing whose diameter is greater than the height of said end wall mounted on the end of the housing remote from said end wall, said casing being enclosed by said front and back walls of the housing, a blower mounted within said casing on a horizontal axis transverse to the longitudinal axis of the housing, an air inlet register disposed in one of said front and back walls in the area of said blower casing and of a size slightly less than the cylindrical area of the casing, an opening in said casing extending from said front to said back wall but of less height than that of the end wall of the casing, a partition wall within the housing spaced from the top wall and defining therewith a reduced cross section, horizontal and longitudinally disposed heating chamber connected at one end with said opening in the blower casing and spaced at its other end from said first end wall, a substantially vertical partition wall extending across the interior of the heater housing beneath said chamber and defining with said front and back walls, said top wall, and said end wall a vertical discharge duct extending below the heating chamber, an electrical heating element mounted within the heating chamber, a laterally extending discharge nozzle at the lower end of said discharge duct, a defroster air outlet opening in said end wall aligned with said heating chamber and a defroster pipe connected thereto.

4. An electric heater according to claim 3, wherein is further provided a pivoted valve in each of said discharge nozzle and defroster pipe for controlling passage of heated air therethrough, and means for operating said valves.

5. An electric heater according to claim 4, wherein said means for operating said valves includes means connecting said valves to each other to move simultaneously.

References Cited by the Examiner

UNITED STATES PATENTS

| | | | |
|---|---|---|---|
| 1,836,649 | 12/1931 | Damm. | |
| 2,158,733 | 5/1939 | Sola | 219—202 X |
| 2,268,478 | 12/1941 | Fehrer | 165—41 X |
| 2,496,517 | 2/1950 | Bradley | 219—370 X |
| 2,518,356 | 8/1950 | Mieras et al. | 165—41 X |
| 2,532,882 | 12/1950 | Beatty. | |
| 2,658,798 | 11/1953 | Meltzer et al. | |
| 2,738,408 | 3/1956 | Cheviron | 219—203 |
| 2,738,718 | 3/1956 | Reynolds. | |
| 3,028,800 | 4/1962 | Anderson | 98—2 |

ANTHONY BARTIS, *Primary Examiner.*